United States Patent [19]
Cagnasso

[11] 4,358,795
[45] Nov. 9, 1982

[54] GRAPHIC SCANNING AND PRINTING DEVICE

[76] Inventor: Giovanni Cagnasso, Via Gabotto 14, Asti, Italy

[21] Appl. No.: 242,050

[22] Filed: Mar. 9, 1981

[30] Foreign Application Priority Data

Mar. 12, 1980 [IT] Italy ................................. 1702 A/80

[51] Int. Cl.³ ............................................. H04N 1/24
[52] U.S. Cl. .................................. 358/295; 358/296; 358/303
[58] Field of Search ............... 358/295, 285, 286, 287, 358/293, 296, 303

[56] References Cited

U.S. PATENT DOCUMENTS

| 37,331 | 1/1863 | Bonelli | 358/295 |
| 3,710,019 | 1/1973 | Hell | 358/293 |

*Primary Examiner*—Howard Britton
*Attorney, Agent, or Firm*—Benasutti Associates, Ltd.

[57] ABSTRACT

A graphic scanning and printing device comprising a scanning element having a plurality of metal bars arranged in series inclined at 10° and movable into engagement with a graphic sign to be reproduced, written in electrically conductive ink, to produce an electrical pulse fed to a solenoid whose core bar prints a dot, through an ink ribbon or the like, the several core bars arranged in the same fashion as said scanning metal bars producing an exact reproduction of the graphic sign.

3 Claims, 4 Drawing Figures

GRAPHIC SCANNING AND PRINTING DEVICE

BACKGROUND OF THE INVENTION

This invention relates to a graphic scanning and printing device for reproduction of graphic signs such as stenographic and mathematical signs, drawings and the like.

The automatic reading of graphic signs and written matter generally has been the object of many studies by search institutes and new types of machines for reading and transmitting written information have been developed for better utilizing the capacity of modern computers and electronic processors. For reading and reproducing printed letters the problem may be considered to have been solved, but not for other types of signs such as italics, shorthand, graphic and oriental signs, biological registrations, drawings, wave forms, radar signals, etc.

SUMMARY OF THE INVENTION

It is therefore an object of the present invention to provide a graphic scanning and printing device for automatically reading and reproducing such graphic signs.

This graphic scanning and printing device according to the invention comprises a scanning element coupled to a printing element. By using electrically conductive ink scanning is effected by means of a pulse train produced by the scanning element and converted into a series of dots by the printing element to produce lines according to the shape of the scanned graphic sign.

DESCRIPTION OF PREFERRED EMBODIMENT

Figure 1:
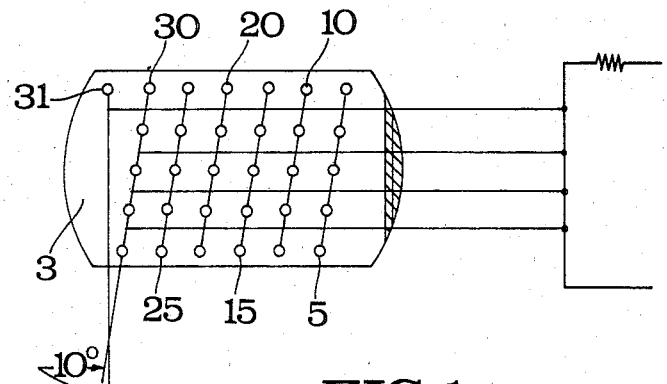
FIG. 1 is a schematic top plan view of the scanning and printing element each having 31 operating positions each provided with a microcontact.

As shown in FIG. 1, each of the scanning and printing elements has 31 operative positions which are obliquely arranged in lines inclined at 10°. This arrangement ensures that the outer circular periphery of each printed dot will be in contact with the outer circular periphery of the preceding dot. Each operative position may be given a code sign and also the alpha numerical symbol may be coded in this manner. As on any programming rod the code 10000 is used for T, this may be applied to the operative position 20, code 10101 for the symbol Y may be applied to position 25, code 11000 for the symbol 0 to position 15, code 00001 for the symbol E to position 5. Code 00100 for the "space" signal is not required in this case as spacing takes place automatically. Therefore, the same code may be applied to position 31 or any other position. The important thing is to apply an electric pulse to the printing element in exactly the same position where it is produced by and on the scanning element.

Figure 2:
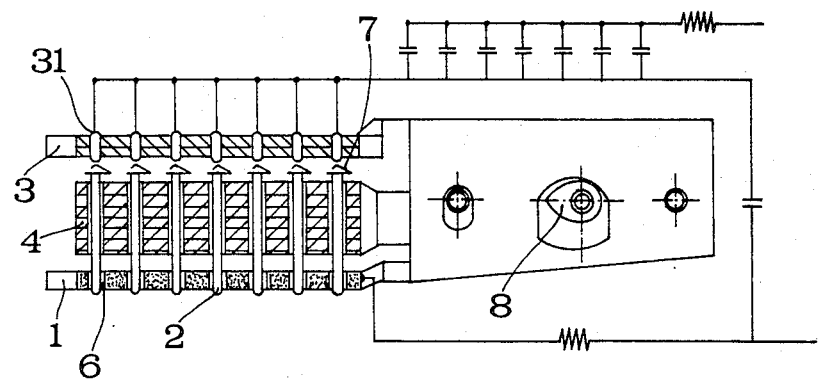
FIG. 2 is a part sectional view of the scanning element.

Referring now to FIG. 2, the scanning element comprises a graphite plate 1 provided with 31 through holes 6 corresponding to 31 cylindrical seats in a horizontal retaining member 4 for slidably receiving metal bars 2 each having a small resilient disk 7 at the upper end for energizing microcontacts located in a member 3. A cam member 8 serves to adjust the scanning element relative to the plane of the paper containing the graphic signs to be reproduced.

Figure 3:
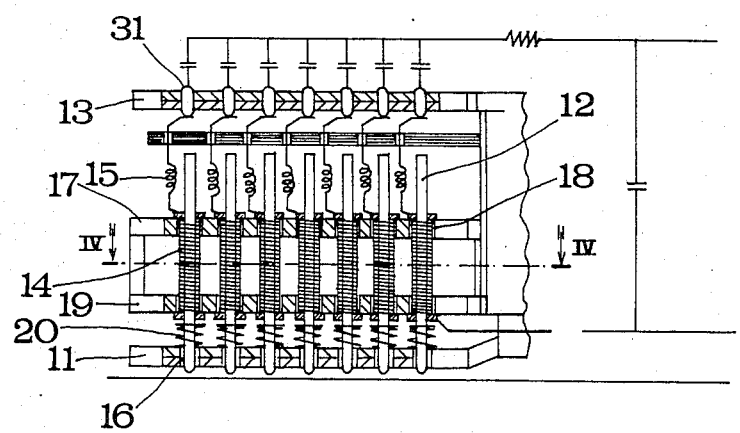
FIG. 3 is a part sectional view of the printing element.
Figure 4:
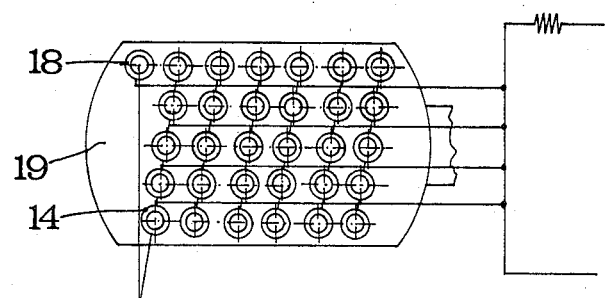
FIG. 4 is a section taken on the line IV—IV of FIG. 3.

The printing element shown in FIG. 3 has a guide member 11 likewise provided with 31 through holes 16 for slidably receiving metal bars 12 each forming the core of a solenoid 14 mounted by means of guide sleeves 18 in a pair of frame members 17 and 19. Terminals 15 of solenoids 14 are held in constant engagement with microcontacts in a member 13. The bars 12 of solenoids 14 are retained by springs 20 inserted between an abutment on the bar 12 and guide member 11.

OPERATION OF THE DEVICE

Assuming that an algebraic function in italics is to be scanned, the scanning element continuously translates with linear movement from left to right with the plate 1 in engagement with the document to be reproduced. The plate 1 and the portion of the graphic sign in contact therewith and each bar 2 getting into contact therewith are energized by a tension tx. The electric pulses thus produced are transmitted through the microcontacts in the member 3 to the microcontacts in the member 13 of the printing element. Each of the microcontacts in the member 13 energizes the associated solenoid 14 whose core bar 12 overcomes the resistance of the spring 20 due to the balance of polarity now established and moves toward the printing paper to trace a dot thereon through a conventional ink ribbon or sheet of carbon paper placed thereon. The rest of the graphic sign is reproduced in the same manner by alternately using the 31 operative positions.

MODIFICATIONS

Although a preferred embodiment of the invention has thus been described and illustrated in the accompanying drawings, it is to be understood that the invention is not limited to this precise embodiment and that numerous changes and modifications obvious to one skilled in the are may be made therein without departing from the scope of the invention as defined by the appended claims. For example, if the capacity of the device is to be increased, the number of operative positions may be increased only along the vertical axis so that the position 31 will be 36, 41, 46 etc.

I claim:

1. A graphic scanning and printing device comprising a scanning element having a plurality of metal bars arranged for vertical sliding movement in series inclined at about 10° in holes in a horizontal retaining member and slidable through holes in a coextensive graphite plate into engagement with a graphic sign to be reproduced, said graphic sign being written in electrically conductive ink to make electrical contact with said metal bars when contacted thereby;

means including microcontacts arranged above and coextensive with said horizontal retaining member;

means for making electrical contact between said vertically slidable metal bars and said microcontacts during vertical upward movement of said metal bars;

a printing element having microcontacts electrically connected to said microcontacts of said scanning element and including a plurality of solenoids each having a vertically movable core bar, said solenoids corresponding in number and arrangement to said vertically movable metal bars of said scanning element, said solenoids being mounted in a pair of parallel horizontal frame members;

a horizontal guide member arranged below and coextensive with said frame members;

resilient means between said horizontal guide member and said vertically movable solenoid core bars to normally hold the latter in a retracted position from a sheet of printing paper adapted to be placed below said horizontal guide member with the interposition of copying sheet material;

said solenoid core bars, when energized by contact of said vertically slidable metal bars of said scanning element with said electrically conductive graphic sign to be reproduced, being arranged to move toward said printing paper to trace a dot thereon, the plurality of dots thus produced by said plurality of solenoid core bars forming an exact reproduction of said graphic sign.

2. A graphic scanning and printing device as claimed in claim 1, wherein said vertically slidable metal bars of said scanning element and said vertically movable solenoid core bars of said printing element are 31 arranged in groups of six and one of seven in a first straight direction and in groups of five in a second direction inclined at 10° relative to said first direction.

3. A graphic scanning and printing device as claimed in claim 1, further comprising cam means for adjusting said scanning element relative to the plane of the sheet containing the graphic sign to be reproduced.

* * * * *